(No Model.)
T. J. TUCKER.
LAWN MOWER.
No. 476,908. Patented June 14, 1892.
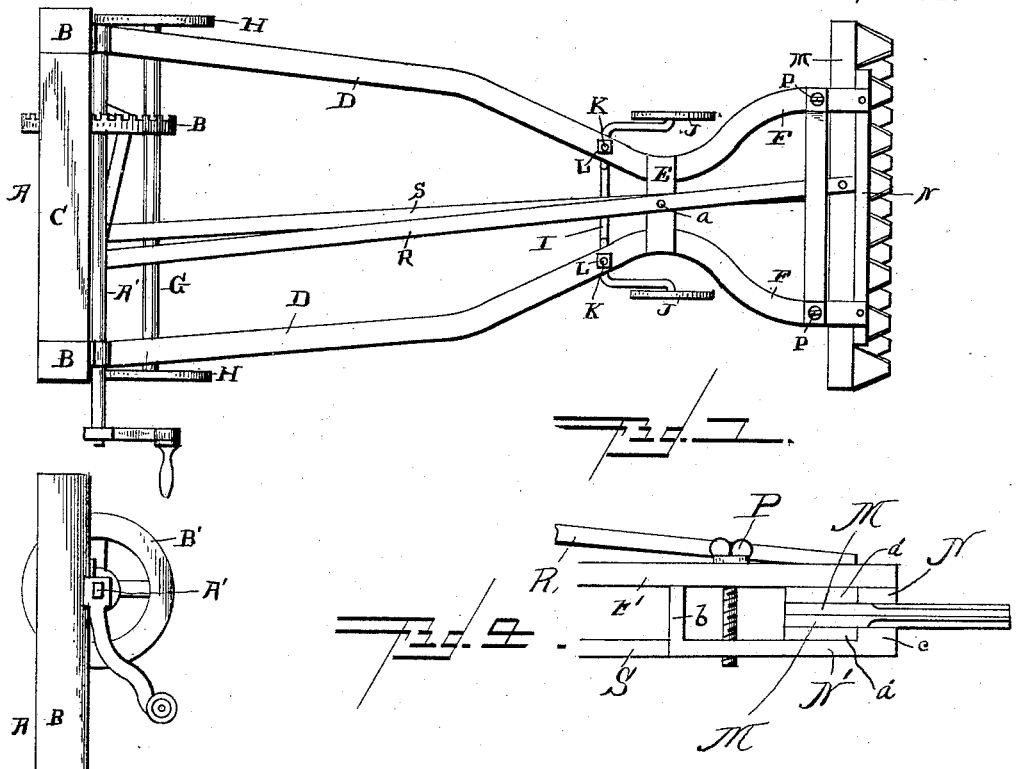
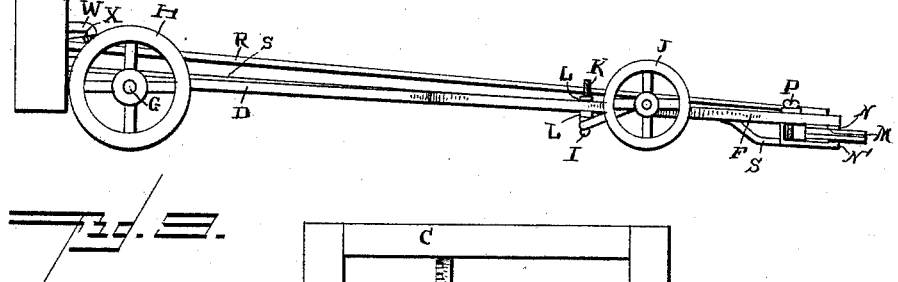
Fig. 2.
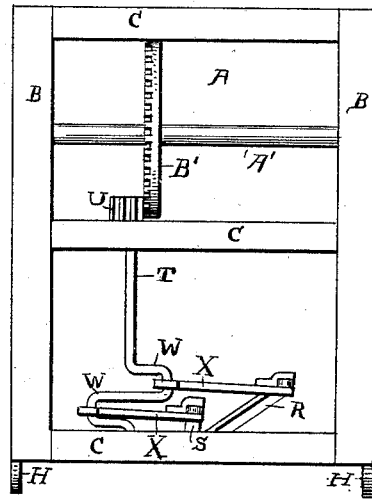
Witnesses
C. S. Frye
E. P. Myers
T. J. Tucker,
Inventor
By
W. T. Fitzgerald & Co,
Attorneys.
THE NORRIS PETERS CO., PHOTO-LITHO., WASHINGTON, D. C.

UNITED STATES PATENT OFFICE.

THOMAS J. TUCKER, OF WEAUBLEAU, MISSOURI.

LAWN-MOWER.

SPECIFICATION forming part of Letters Patent No. 476,908, dated June 14, 1892.

Application filed December 31, 1891. Serial No. 416,712. (No model.)

*To all whom it may concern:*

Be it known that I, THOMAS J. TUCKER, a citizen of the United States, residing at Weaubleau, in the county of Hickory and State of Missouri, have invented certain new and useful Improvements in Lawn-Mowers; and I do hereby declare the following to be a full, clear, and exact description of the invention, such as will enable others skilled in the art to which it appertains to make and use the same.

My invention has relation to improvements in lawn-movers; and it consists in the peculiar construction, certain novel combinations, and the adaptation of parts hereinafter described, and particularly pointed out in the claims appended.

In the accompanying drawings, Figure 1 is a top plan view of my improved lawn-mower. Fig. 2 is a side elevation of the same. Fig. 3 is a rear elevation, and Fig. 4 is an enlarged detail side elevation, of the forward end of the runner-frame.

Referring by letter to the said drawings, A indicates the main frame of my improved machine, which preferably comprises the standard-uprights B and the transverse beams C, connecting said uprights at intermediate points in the length thereof.

Fixedly connected to and extending forwardly from the uprights B are the converging branches D of the approximately horizontal runner-frame, which are connected by a transverse strap E, and beyond said strap merge into the forwardly-diverging branches F, which serve to support the cutting apparatus presently to be described.

Journaled in suitable bearings beneath the converging branches of the runner-frame is the wheel-axle G, upon which is fixed or loosely mounted the traveling wheels H, which may be of any suitable construction.

I indicates the transverse axle of the gage-wheels J, which axle is provided at its ends with the forward and lateral branches, upon which latter are loosely mounted the said wheels J, which rest between the forwardly converging and diverging branches of the runner-frame.

Fixedly connected to the transverse axle I of the gage-wheels J, adjacent to the ends thereof, are vertically-disposed screw-bolts K, which pass through apertures in the converging branches D of the runner-frame and are provided above and below said branches with nuts L, through the medium of which the forward end of the frame may be raised and lowered and the cutting height of the sickle or sickles consequently fixed, as will be presently described.

For the cutting apparatus of my improved mower I prefer to employ two reciprocating sickle-bars, as illustrated, although in some instances a single sickle-bar might be employed in conjunction with a suitable finger-bar, if desirable.

As better illustrated in Figs. 1 and 4 of the drawings, the sickle-bars M are provided upon their outer sides at their inner edge with longitudinal shoulders $a'$, for purpose presently perceived.

Connected to the under side of the diverging branches F of the runner-frame, at the forward ends thereof, is a transverse bar N, which bears against the upper side of the upper sickle-bar M in advance of the shoulder thereof and serves to assist in retaining said bar in position.

N' indicates clamps which are designed and adapted to serve, in conjunction with the bar N, to hold or retain the sickle-bars in position. These clamps N' are provided at their rear ends with upwardly-disposed angular branches $b$, which bear against the under side of the branches F, and they are provided at their forward ends upon their upper sides with shoulders $c$, which rest in advance of the shoulders $a'$ of the lower sickle-bar M and serve to hold said bar in position.

Passing loosely through vertically-disposed apertures formed in the branches F are screws P, which pass through the threaded apertures formed in the clamps N', and are provided upon their upper ends with wing-nuts or the like, whereby they may be readily turned to tighten or loosen the clamps N, as desirable.

By the provision of clamps such as described for holding or retaining the sickle-bars in position it will be readily perceived that said bars may be readily removed and replaced, and may be readily tightened or loosened when desired.

Fulcrumed upon a vertically-disposed pin *a*, fixedly mounted in the transverse straps E above and below said straps, are the longitudinal levers R S, which are pivotally connected at their forward ends to the upper and lower sickle-bars M, respectively.

Journaled in suitable bearings in the transverse beams C of the main frame is a vertical shaft T, which carries a pinion U at its upper end, and is provided at a suitable intermediate point in its length with oppositely-directed crank branches W W, which are connected by links X to the upper and lower longitudinal levers R S, whereby it will be seen that when the shaft T is rotated its motion will be converted into reciprocatory motion and be transmitted to the sickle-bars, which will be rapidly reciprocated in opposite directions with respect to each other.

Journaled in suitable bearings upon the main frame is the transverse drive-shaft A', upon which is fixed a vertical gear-wheel B', which meshes with and drives the pinion upon the upper end of the vertical crank-shaft T.

When it is desired to raise the cutting height of the sickle or sickles, the nuts L above the converging bars D of the runner-frame are turned so that they will approach the upper ends of the screw-bolts K, and when said nuts are in the position desired the runner-frame is raised to the same, after which the nuts L beneath the branches D are turned up against said branches, so as to fix the same in their adjusted position. When it is desired to lower the cutting height of the sickle-bars, the operation just described is reversed.

In operation the attendant simply pushes the machine, and when the crank is employed turns the same, when the sickle-bars will be caused to rapidly reciprocate.

From the foregoing description, taken in connection with the drawings, it will be readily perceived that I have provided a lawn-mower embodying an exceedingly cheap, simple, and durable construction, not liable to get out of order and adapted to thoroughly perform the function desired.

Having thus described my invention, what I claim, and desire to secure by Letters Patent, is—

In a lawn-mower substantially as described, the combination, with the runner-frame, the cross-bar N, connecting the forward ends of the branches of said frame, and the reciprocatory sickle-bars having the longitudinal shoulders upon their outside at their inner edges, of the clamps N', having the angular branches *b* at their rear ends and the shoulders *c* at their forward ends, and the set-screws P, headed at their upper ends and passing loosely through apertures in the branches of the runner-frame and through threaded apertures in the clamps N', all substantially as and for the purpose set forth.

In testimony whereof I affix my signature in presence of two witnesses.

THOMAS J. TUCKER.

Witnesses:
R. J. MARTIN,
A. A. JOHN.